J. A. CONNOLLY.
BROODER.
APPLICATION FILED NOV. 7, 1910.
983,481.
Patented Feb. 7, 1911.
2 SHEETS—SHEET 1.
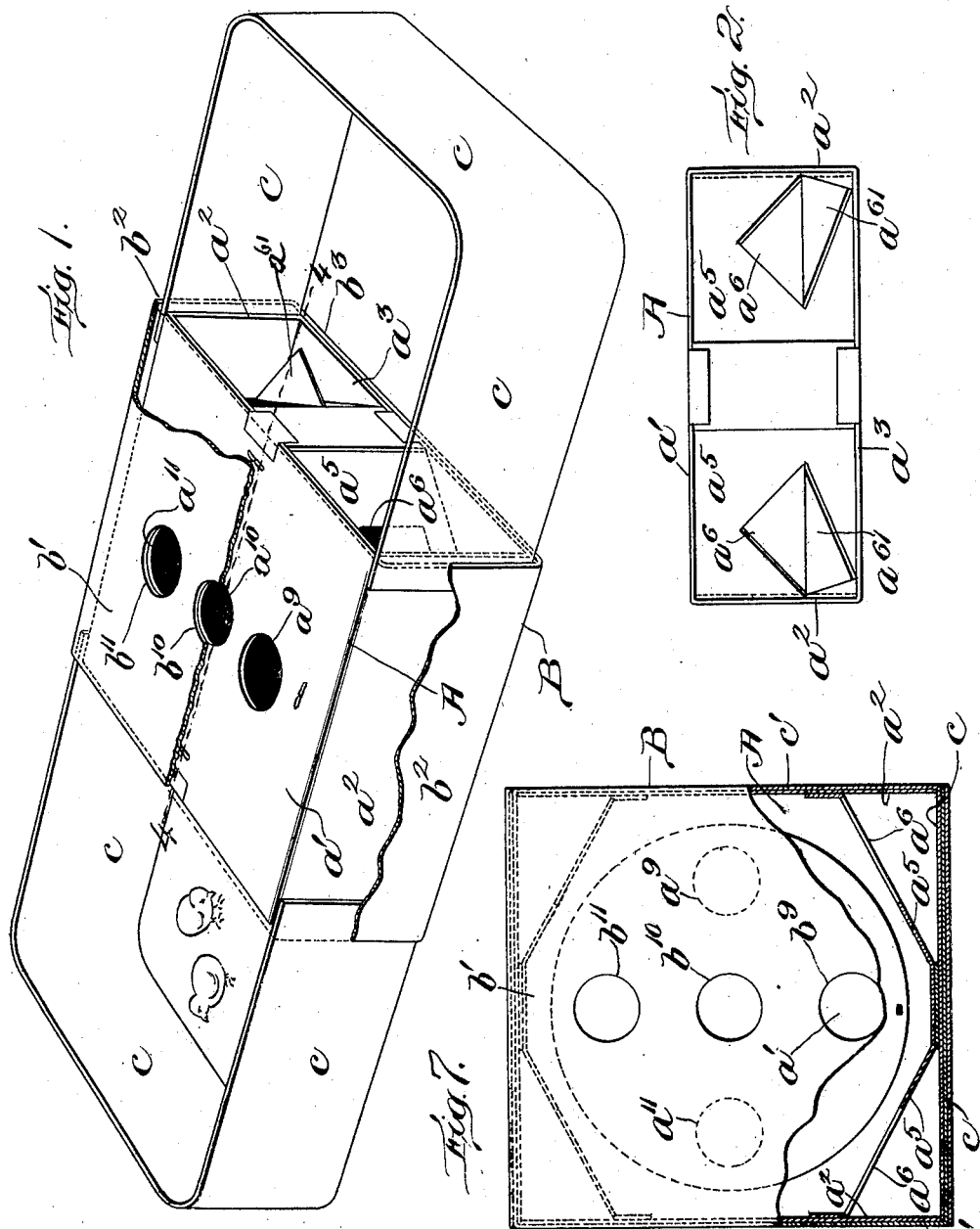

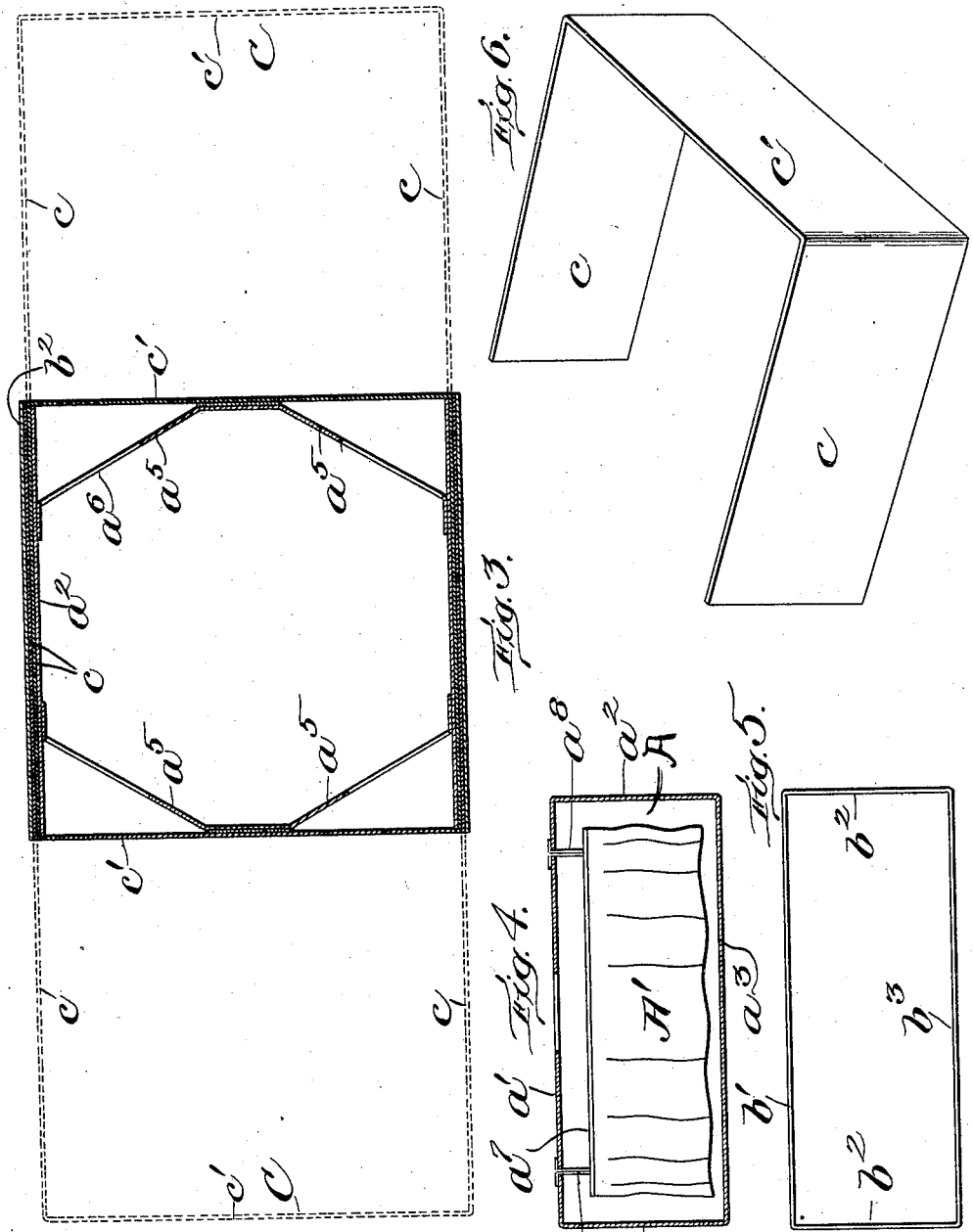

UNITED STATES PATENT OFFICE.

JOSEPH A. CONNOLLY, OF EVERETT, MASSACHUSETTS.

BROODER.

983,481.

Specification of Letters Patent.

Patented Feb. 7, 1911.

Application filed November 7, 1910. Serial No. 590,960.

*To all whom it may concern:*

Be it known that I, JOSEPH A. CONNOLLY, a citizen of the United States, residing at Everett, in the county of Middlesex and State of Massachusetts, have invented new and useful Improvements in Brooders, of which the following is a specification.

My invention relates to brooders such as are used for chicks immediately after they are hatched and the object of my invention is to provide an improved brooder of the class shown and described in my United States Letters Patent No. 973,174, dated October 18, 1910.

It is desirable that brooders for chicks be well ventilated, that provision be had for regulating or controlling the temperature and ventilation of the interior thereof, and that the interior of the brooder shall be devoid of acute corners into which chicks can be crowded and injured or killed.

My invention aims to produce a brooder of the class referred to which will fully meet these requirements.

In the accompanying drawings: Figure 1 is a perspective view, partly broken away, showing a brooder embodying one form of my invention. Fig. 2 is an end view of the inner box. Fig. 3 is a sectional plan view of the brooder shown in Fig. 1 with the yard or coop fences, hereinafter described, in their closed or retracted positions. Fig. 4 is a transverse section on the line 4—4 of Fig. 1, the hover shown in elevation. Fig. 5 is an end elevation of the outer box of the brooder shown in Fig. 1. Fig. 6 is a perspective view of one of the coop or yard fences hereinafter described. Fig. 7 is a plan view, partly in section, showing the parts of the brooder of Fig. 1 in their closed positions.

The inner box A of my improved brooder comprises four outer walls $a'$, $a^2$ and $a^3$ formed into a rectangular box, and four vertical interior walls or partitions $a^5$ diagonally arranged at the corners of box A so that the interior of the latter has no sharp or acute corners into which the chicks can crowd or be crowded and be injured or killed. Each of these diagonal walls or partitions is made with a passage or doorway $a^6$ produced by simply slitting the material of the wall so as to leave a triangular door flap $a^{61}$ which can be bent down to open the doorway or be bent up to close the doorway. The diagonal walls are strips of sheet material connected with box A in any suitable manner as by adhesive tape.

Within box A is a hover A' made with a disk shaped top $a^7$ suspended from top wall $a'$ by hangers $a^8$ so as to leave an air passage between the top $a^7$ and walls $a^2$ and an air space between top $a^7$ and wall $a'$. The top wall $a'$ of inner box A is made with three openings $a^9$, $a^{10}$ and $a^{11}$, and when this inner box occupies its open position within outer box B, as in Fig. 1, these openings register with three similar openings $b^9$, $b^{10}$ and $b^{11}$ provided through the top wall $b'$ of outer box B. When inner box A is withdrawn from outer box B, given a quarter turn and slid back in place again, it occupies its closed position as shown in Fig. 7, with the openings $a^{10}$ and $b^{10}$, which are at the center of the top walls of their respective boxes, registering as before, but with the pair of openings $a^9$ and $a^{11}$ offset from the pair of openings $b^9$ and $b^{11}$ so that the first mentioned pair are closed by top wall $b'$ while the last mentioned pair are closed by the top wall $a'$. When the inner box A occupies either its closed or open position it may be adjusted within outer box B so as to offset the registering holes, more or less, to regulate the ventilation and temperature of the interior of the box A. Free circulation of the air is provided for by the openings in the tops of the two boxes, the space above the top $a^7$ of hover A' and the space between the hover and side walls of inner box A. Also when inner box A occupies either its open or closed position the air circulation can be quickly regulated in either of the methods described above.

In order to provide for adjusting the inner box a quarter turn as described above said box is preferably made square as viewed in plan so that it fits the interior of box B which is also substantially square in plan. That is, the exterior of inner box A and the interior of outer box B are both square as viewed in plan except that sufficient room or space is provided between the side walls $b^2$ of outer box B and inner box A to permit the side walls of a pair of yard or coop fences C to fit in between the two boxes. The fences C are preferably made of a continuous strip of flexible material, preferably corrugated paper, scored or creased, if desired, in the well known manner, to permit of its being bent into the desired shape, and when each fence is drawn out as shown in Fig. 1, and as indicated by dotted lines in Fig. 3, an inclosed yard is provided at each end of the brooder to and from which the chicks may pass through the doorways $a^6$.

As will be clear the open ends of the inner box A may be closed when desired without relative adjustment of the two boxes, by sliding fences C back against the ends of the inner box A so that they occupy the positions shown in Fig. 3. That is, ordinarily the two boxes A and B will be assembled as in Fig. 1 and closure or opening effected if and as desired by adjusting fences C and without rotatively adjusting the two boxes A and B. In referring above to the open and closed relation of boxes A and B, I mean that when the two boxes are assembled as in Fig. 1 where the doorways $a^6$ are opposite the open sides of outer box B, the two boxes are in open relation and when said boxes are assembled as in Fig. 7, where the doorways $a^6$ are opposite the side walls $b^2$, the two boxes are in closed relation.

For the first day or two after the chicks are hatched inner box A would occupy its closed position with the fences C in their closed positions. Then the walls at the ends, top and bottom of the brooder will be of double thickness while the walls at the sides of the brooder will be of treble thickness. This is desirable because freshly hatched chicks are very delicate and should be kept warm and well protected from cold. When the parts of the brooder are arranged as shown in Fig. 1, it is customary to cover the ground within fences C and the floor of box A with a layer of bran or the like to a depth about on a level with the sills of doorways $a^6$, and for this reason the sills of said doorways are elevated somewhat above the level of the bottom of box A.

It will now be clear that my improved brooder has ample ventilating openings, with means to close or regulate their area and that the air circulation and interior temperature may be regulated as desired by simple adjustments; that the peculiar shape and relative dimensions of the two boxes permit of the brooder being quickly converted into an open or closed affair by a simple adjustment of the inner box or the walls and that the interior diagonal walls provide an interior which has no sharp corners into which the chicks can crowd.

When the parts of the brooder are assembled as shown in Fig. 7 the two holes $a^{10}$ and $b^{10}$ register and provide a ventilating opening communicating with the interior of the brooder which otherwise is completely closed. If desired, however, the brooder may be completely closed by shifting the outer box B relatively to the other parts until the holes $a^{10}$ and $b^{10}$ are sufficiently offset to effect this. Or by adjusting the outer box B relatively to the other parts the two holes $a^{10}$ and $b^{10}$ may be relatively positioned to reduce the size of this ventilating passage to any desired extent. When the parts are adjusted as shown in Fig. 1 the ventilating holes $a^9$, $a^{10}$, $a^{11}$, $b^9$, $b^{10}$, $b^{11}$, may be wholly or partially closed by suitably drawing out the inner box, as will be obvious, and at the same time, if desired, the walls C may be placed in closed position.

When the parts of the brooder are assembled as shown in Fig. 7, it is desirable that the doors $a^{61}$ occupy their closed positions so as to prevent the chicks from having access to the triangular space outside of the diagonal partitions.

I claim:

1. A brooder comprising two relatively adjustable boxes, one within the other, provided with openings adapted to register so as to form an air passage that is regulated in size by moving the two boxes relatively to one another.

2. A brooder comprising two relatively adjustable boxes, one within the other, each provided with openings which register with those in the other box in one position of the two boxes and which are closed when the relative position of the two boxes is shifted.

3. A brooder of the class described comprising a square outer box; a square inner box adapted to fit telescopically within the outer box either sidewise or endwise so that the two boxes can be assembled either in closed or open relation, and one or more doors in one of the walls of the inner box, said openings being arranged to register with an opening in the outer box when the two boxes are assembled so as to occupy one relation and to be offset and closed when the two boxes are assembled so as to occupy the other relation.

4. A brooder of the class described comprising an outer box and an inner box adapted to fit telescopically within the outer box and openings in one of the walls of each box adapted to register when said boxes are assembled together so as to provide an air passage whose size may be regulated by relative sliding adjustment of the two boxes.

5. A brooder of the class described comprising a square outer box; a square inner box adapted to fit telescopically within the outer box and made upon its interior with diagonal walls extending across the corners of the box interior, said walls being made with doorways for the chicks.

6. A brooder of the character described comprising a square outer box; a square inner box adapted to fit telescopically within the outer box either sidewise or endwise so that the two boxes can be assembled either in closed or open relation, and a yard fence consisting of a strip of material having its ends slidably and removably arranged between the sides of the two boxes.

Signed by me at Boston, Mass., this 5th day of November, 1910.

JOSEPH A. CONNOLLY.

Witnesses:
MARY A. NYHAN,
JOSEPH T. BRENNAN.